UNITED STATES PATENT OFFICE.

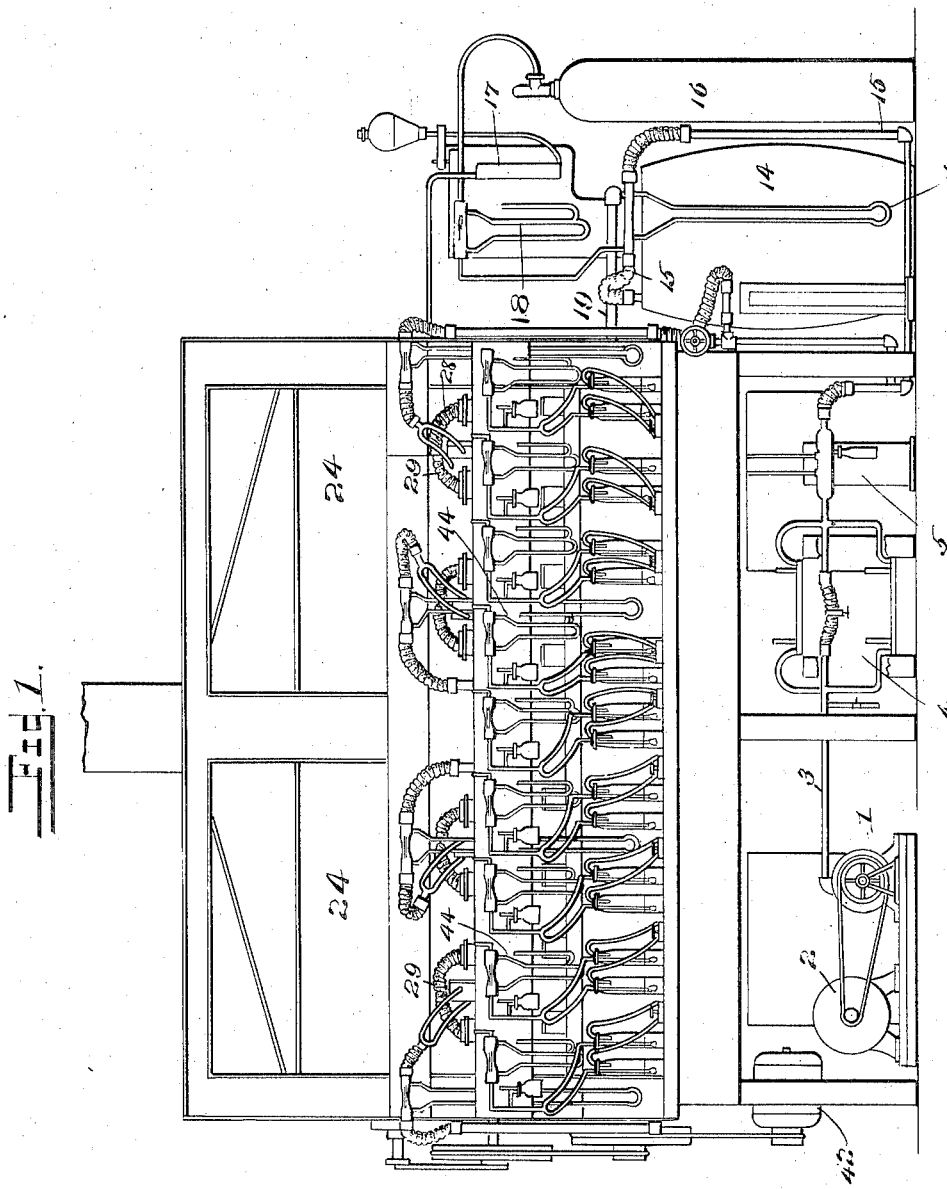

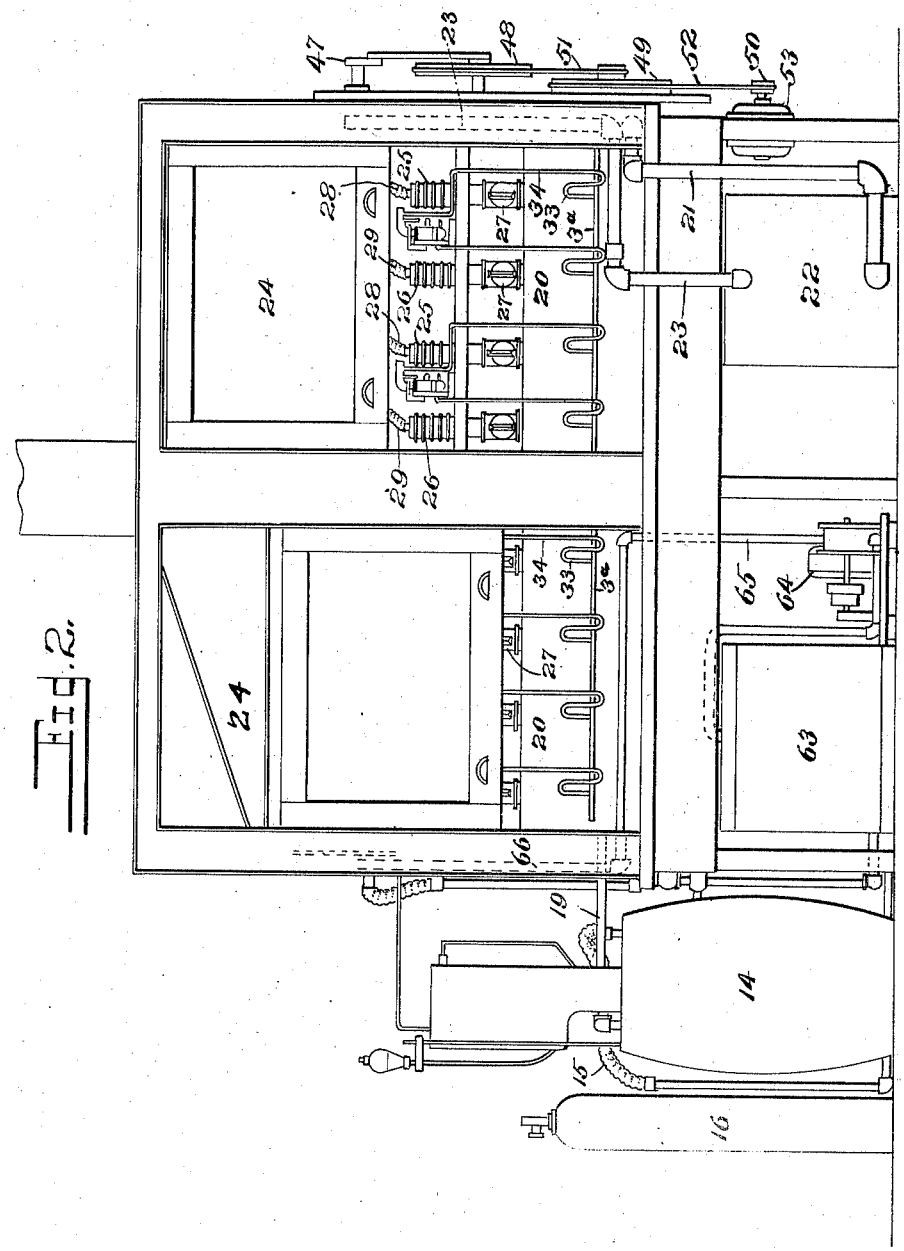

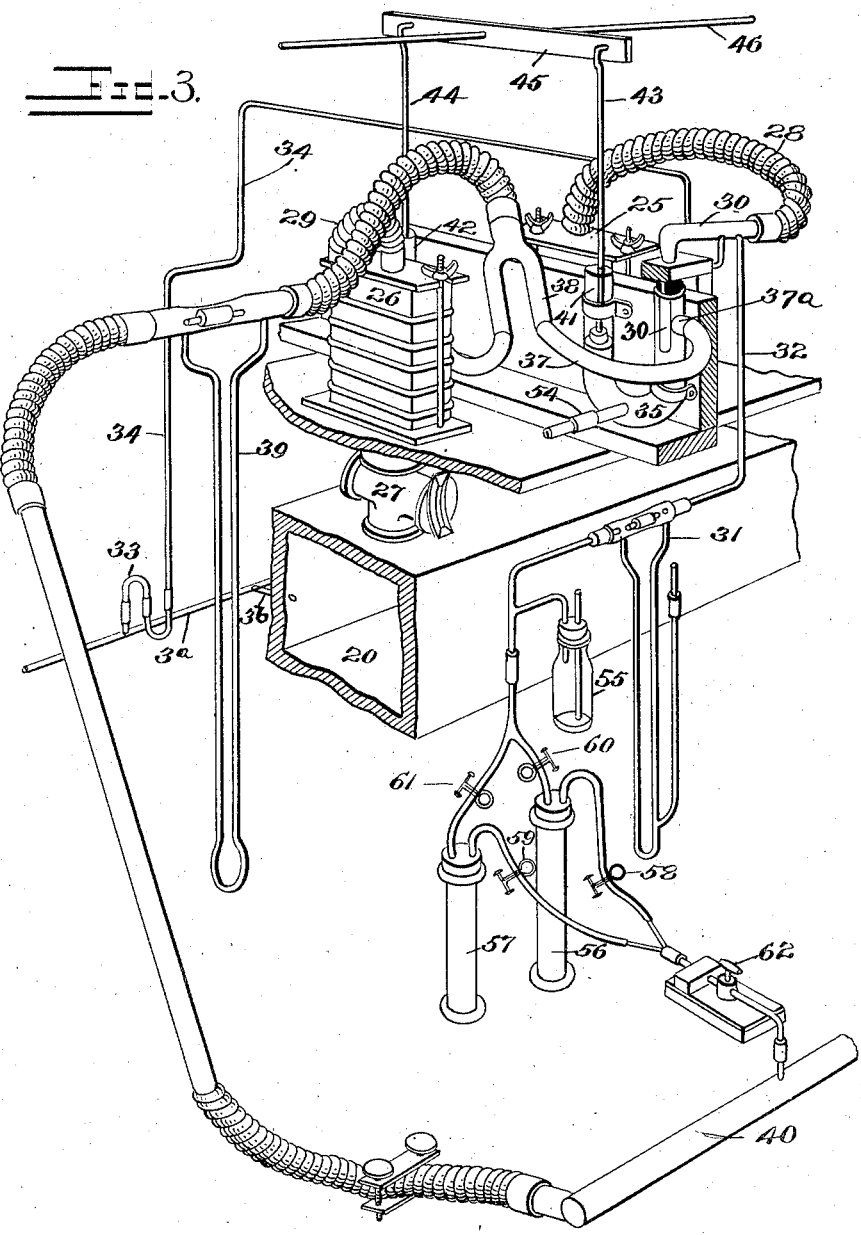

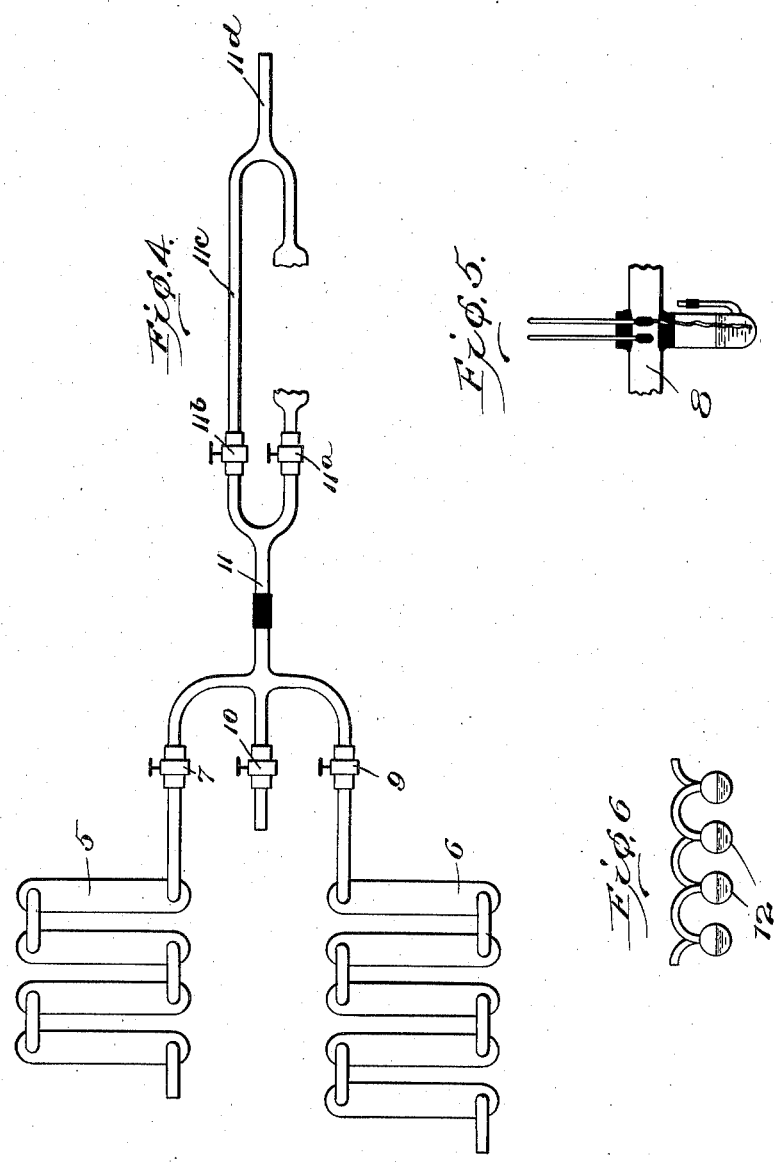

ARNO C. FIELDNER, OF PITTSBURGH, PENNSYLVANIA.

METHOD AND APPARATUS FOR TESTING CANISTERS.

1,307,813.   Specification of Letters Patent.   Patented June 24, 1919.

Application filed January 10, 1919.   Serial No. 270,609.

*To all whom it may concern:*

Be it known that I, ARNO C. FIELDNER, a citizen of the United States, residing in Pittsburgh, Pennsylvania, have invented certain new and useful Improvements in Methods and Apparatus for Testing Canisters, of which the following is a specification.

This invention relates to methods and apparatus for testing air purifying canisters used in connection with gas masks.

One of the objects of this invention is to provide a method and apparatus for efficiently and accurately determining how long canisters can withstand the action of certain gases and vapors, particularly poisonous, toxic, or corrosive gases, such as chlorin, phosgene, etc., before losing their effectiveness.

Another object of this invention is to provide a method and apparatus for testing canisters, the conditions under which the tests are made being kept under control.

A further object of this invention is to provide a method and means for producing an intermittent flow of gas through the canister, thereby simulating the manner in which gas is drawn through a canister by a person breathing through a gas mask.

Another object of this invention is to eliminate the disagreeable feature of serving the masks on human beings in the man test of canisters, thereby saving the time of a considerable number of men, avoiding the exposure of human beings to the danger of breathing poisonous or toxic gases and eliminating the variations due to different sensitivities of the men, to different psychological effects and to their different breathing rates.

A further object of this invention is to provide a method and means of regulating the humidity of gases entering the canisters, for continuously sampling effluent gases from the canisters, in order that it may be ascertained when the canister is no longer effective in holding back all of the toxic gases, to determine the efficiency of the canister after the "break," to determine the pressure drop of the gases in passing through the canister, and for regulating the concentration of gas or vapor in a mixture of gas or vapor with air entering the canister.

A still further object of this invention is to provide a method and means for testing a plurality of canisters simultaneously, the canisters being arranged in multiple, and the effluent gas from two or more canisters being measured by a single flow-meter.

A still further object of this invention is to pass practically all of the gas used in the test through the canisters, thereby avoiding unnecessary waste of gas.

The canisters used with gas masks are provided with absorbent material so arranged that all of the gases entering and leaving the canisters must pass therethrough in order that these absorbents may take up the deleterious gases and allow only the harmless gases to pass through. After being in use for a time the absorbent loses its activity as such and the deleterious gases begin to pass through. When this occurs the canister is said to "break."

Up to the "break" point the canister is said to be 100 per cent. efficient; from the "break" point on the efficiency of the canister diminishes more or less rapidly, until its efficiency is practically zero, *i. e.*, the absorbent has become completely saturated with the gas at the given concentration and the percentage of gas leaving the canister is the same as that entering. Ordinarily a test is not run to zero efficiency, but is stopped at 90, 80 or 50 per cent. The percentage efficiency is determined by analyzing samples of the entering and effluent gas and is calculated by the following formula:

$$\text{Percentage efficiency} = \frac{\text{Conc. of entering gas} - \text{Conc. of effluent gas}}{\text{Conc. of entering gas}} \times 100.$$

The result of a complete canister test is most conveniently plotted in the form of a curve, the abscissæ being time in minutes to the middle of the sampling period, and the ordinates being the percentage efficiency at that time.

It is to determine this breaking point of the canister and its efficiency curve that this method and apparatus is provided.

Among the advantages of the machine results over those obtained by the man test are:

1. The humidity may be accurately controlled and is kept constant for all tests.

2. The concentration of the mixture of gas and air is much more accurately controlled never varying more than 5 per cent.

3. The variations due to different breathing rates of men are eliminated, leaving only the variations in the canisters themselves.

4. The qualitative test for the gas will come at a certain efficiency of absorption in all cases, eliminating the variations to different sensitivities of the men and to different psychological effects upon the men.

The results are, therefore, while checking the average man test results, more accurate, more concordant and more easily obtained. Also, by varying the total volume of gas-air mixture per minute and the interval between the successive intermittent flows of gas through the canisters, results may be obtained corresponding to those of men at rest, doing moderate work or under violent exercise.

Reference is to be had to the accompanying drawings in which certain parts of the apparatus are shown more or less diagrammatically.

Figure 1 is a front elevation of the apparatus showing the several parts thereof in testing position.

Fig. 2 is a rear elevation of same.

Fig. 3 is a fragmentary, perspective view, showing the mechanism for producing intermittent suction of gas through the canisters and also the means for testing the effluent gases.

Fig. 4 is a plan view showing the arrangement of the water and $H_2SO_4$ cylinders of the humidifier and also the connection to the hygrometer.

Fig. 5 is a detailed view of the hygrometer.

Fig. 6 shows an apparatus which may be substituted for the type of water and $H_2SO_4$ cylinders shown in Fig. 4.

Referring to the drawings, (1) indicates an air pump operated by a motor (2). The air passes from the pump through a pipe (3) to a humidifier (4). The humidifier, which is more clearly shown in Fig. 4 consists of two sets of cylinders (5) and (6). The cylinders of each set are arranged in series, one set containing water and the other $H_2SO_4$. The humidity of the air may be controlled by regulating the amount of air which passes over the water and over the $H_2SO_4$. The air passing through the cylinders containing water is conducted through the valve (7) on to the hygrometer (8), while the air passing through the cylinders containing the $H_2SO_4$ passes through the valve (9), to the hygrometer (8). This hygrometer is of the ordinary dry and wet bulb variety and is shown more or less diagrammatically in Fig. 5.

An additional means of regulating the humidity of the air is afforded by the valve (10) which admits air directly to the conduit (11). It is in this conduit (11) that air passing over water joins the air passing over the $H_2SO_4$. Instead of passing air over both sets of cylinders (5) and (6), the humidity can also be regulated by admitting air through the valve (10) and over one of the sets of cylinders (5) and (6).

In Fig. 6 is shown a modified form of apparatus consisting of the bulbs (12) and holding water or $H_2SO_4$ instead of the glass cylinders shown in Fig. 4.

In testing the humidity of the air, the valve ($11^a$) is opened and air allowed to pass through the hygrometer (8). After the test, valve ($11^a$) is closed, valve ($11^b$) is opened and the air will pass through the conduit ($11^c$) into the line ($11^d$), then on to a flow-meter (13) and then into the mixing tank (14) by way of the pipe (15).

The gas to be tested, such as chlorin, phosgene, etc., is supplied from a cylinder (16) and flows through a constant head device (17) and flow-meter (18) into the air line (15) and then to the mixing tank (14). The entrance pipe from the air line leads almost to the bottom of the mixer. The mixture of air and gas leaves the mixer (14) by way of a pipe (19) and enters the gas box (20), (see Fig. 2), and the excess mixture leaves the gas box at the opposite end through a pipe (21) and goes into an absorbing box (22), from which any unabsorbed gas passes through the pipe (23) into the hood (24). The absorbing box contains trays (not shown), the bottoms of which are made of wire mesh. A gas tight fit should be made between the trays themselves and the sides of the box and a substance, such as rubber packing, is tacked around the trays. A filler of plastic material is used for the cracks and seams and the box is covered with a protective coating; for example, shellac. The excess gas-air mixture from the box (20) is blown in at the bottom of box (22) and comes in contact with absorbing materials, such as charcoal, soda-lime, etc., placed in the wire trays, the residual gas leaving the top of the absorbing box (22) and passing into the hood (24) by way of the pipe (23).

The gas-air mixture is sucked from the box (20) into canisters (25) and (26). The box (20) is provided with a plurality of holes in its top, one hole for each of the canisters to be tested at one time and one additional hole in the top for sampling entering gas. The gas box should be made of material which is resistant to the action of gases and in this apparatus stoneware is preferred.

The canisters are not placed directly over the holes in the gas box (20), but a gas resisting stop-cock (27) made of material, such as stoneware, is fitted in each hole and the canisters placed over the stop-cocks. Tight connection is necessary between the canister, stop-cock and gas box, and a litharge-glycerin cement may be used.

One of the principal features of the apparatus is an approximation of breathing by intermittent suction, the means of obtaining it being shown in Fig. 3. The canisters (25) and (26) are run in pairs, and have connections (28) and (29), preferably of rubber. The connection (28) leads to a tube (30), which is connected with an effluent flow-meter (31) by means of a tube (32), and which also communicates with a manometer (33) by means of the tube (34), the other end of the manometer being connected to the gas box (20) by means of the pipes (3$^a$) and (3$^b$), and thereby gives the pressure-drop through the canister.

The tube (30) extends into one arm of a U-tube (35) to a point below a side opening (37$^a$) in this arm, the end of the tube (30) being open. A tube (37), preferably of a flexible material, such as rubber, joins the side opening (37$^a$) to one branch of a Y (38), the other branch of the Y being connected in a similar manner to the other of the pair of canisters operated with the large flow-meter (39), which is in turn connected to the waste pipe (40). The canister (26) is also provided in a similar way with a U-tube just like (35), and which is connected to the other branch of the Y, the stem of the Y forming a common passage for the effluent gases from the canisters (25) and (26). The U-tube (35) and in a similar way the other U-tube are partly filled with a liquid, preferably mercury, to a level below the end of tube (30), and plungers (41) and (42) (made of wood) are operated up and down in the other arm of each U-tube. This, by displacement of mercury, gives the rise and fall of the mercury in both arms of the U-tubes at once, and automatically seals and opens the line between the Y and the canister as the mercury rises above the lower part of the tube (30) and then falls below such level. Each canister of the pair is thus connected in this way to a flow-meter, the air being drawn alternately first through one and then the other canister. The plungers are operated by means of the rods (43) and (44), the beam-bar (45) and the rock-shaft (46). This rock-shaft derives its motion from the eccentric (47) (see Fig. 2), the pulleys (48), (49) and (50) and belts (51) and (52). The pulley (50) is mounted on a shaft which is operated by a motor (53). The oscillatory motion of the rock shaft causes the plunger (41) to move in a counter direction from the plunger (42); gas is thus drawn through each canister for about one-half the time. The period during which gas is drawn through canister (25) is non-coincident with that during which gas is drawn through the other canister (26). While one canister is sealed the other is opened. It should be understood that this invention is not limited to the operation of but two canisters with a single flow-meter as it is obvious that three or more canisters could be worked with a single flow-meter if the proper adjustment in the valves is made. Also the period during which gas is sucked through one canister may lap with that during which gas is sucked through another of the set of canisters operated with the same flow-meter; also, that there could be a gap between the periods during which gas is drawn through one canister and that during which gas is next drawn through another canister of the set of canisters operated with the same flow-meter.

A plug (54) is connected with the bottom of each U-tube for the purpose of drawing out the liquid when it is desired to remove the same.

In addition to the intermittent flow of gas through the canister a small quantity of gas is continually drawn through and measured by the small flow-meter (31). This is used for the quantitative test of effluent samples. This flower-meter is fitted with a vacuum relief consisting of a small bottle (55) containing a liquid, such as mercury and in case of a sudden excessive suction, air will be drawn through the vacuum relief bottle (55) and the liquid in the flow-meter (31) will not be pulled over. The bubbling flasks (56) and (57) indicate when gas is passing through the flow-meter. These bubbling flasks contain liquid to which an indicator is added for qualitatively testing the effluent gas. By the proper operation of the pinch-cocks (58), (59), (60) and (61), gas may be made to pass through either or both of the bubbling flasks (56) and (57), the unabsorbed gases passing on from the bubbling flasks through the stop-cock (62) to the waste pipe (40).

The bubbling flasks may also be used for testing the efficiency of the canister after the "break". Before the "break" effluent gas is passed through one of these flasks containing some of the test solution, the entrance to the other flask being closed. This other flask contains a measured quantity of standard solution, and after the "break" the effluent gas is diverted into it for a definite time. The quantity of absorbed gas may thus be determined. While gas is being passed through one flask, the other flask may be emptied and then filled with a known quantity of standard solution for the next test.

All of the effluent gas from the canister which is not subsequently absorbed passes out through the waste pipe (40) from which it is drawn through the absorption box (63) by the fan (64) and passes out by way of the pipes (65) and (66) to the hood (24).

The general procedure for testing is as follows:

The blower is started and the humidity is regulated to a convenient definite quantity which is preferably about 50 per cent., by varying the proportion of dry and moist air from the humidifier. This regulation is acomplished by opening or closing the stopcocks in the moist and dry air lines comprising the water and $H_2SO_4$ cylinders, respectively. A change in the amount of air passing over the water or $H_2SO_4$ is found to give a different reading on the wet bulb thermometer inside of three minutes. The gas is turned on and the concentration sample taken about five minutes later. The concentration remains very constant, but in case it needs regulation this can be done while the canisters are being put on the machine. This regulation may be made by raising or lowering the level of the water in the glass cylinders. Eight canisters, constituting a set in connection with this apparatus, which have previously been tested for leaks and for the pressure drop in the gas when a given volume, e. g. 85 liters per minute is passed through them, are put in place upon the machine and the canisters are then tested for leaks in position. This is really a test of the apparatus and connections and is made as follows:

With the stone-ware stop-cock (27) closed, and the plunger (41) raised in the U-tube (35), thus opening tube (30) to the Y, a small amount of suction is turned on. If there is no leak, the mercury will be drawn up in the suction arm of the U-tube and held there after the suction is turned off. If there is a leak the mercury will not rise and the leak must be located and removed. When all the canisters have similarly been tested for leaks, and the humidity and concentration adjusted, the stoneware stop-cocks are opened, plunger mechanism started and the suction turned on the canisters one pair at a time.

This should be regulated to draw through the pair of canisters a total volume of 64 liters of gas-air mixture per minute, equally divided between the two canisters, and then one liter per minute is diverted from the effluent gas of each canister for quantitative test as herein described.

The pressure drops through the canisters in a pair must be equal to insure equal volumes being drawn through each canister. This pressure drop is read on the manometer (33). In case the drop is less through one canister, pressure is introduced in that line by partially opening the stone-ware stop-cock leading from the box to the canister. This is read and adjusted in each pair of canisters every hour throughout the run.

It is thus seen that during the test the canisters are in multiple arrangement with respect to their position on the gas box (20).

When chlorin gas mixtures are tested a thin layer of glycerin is poured on top of the mercury in the suction arm of the U-tube. With mercury alone, the chlorin which comes through the canister after the break, would react instantly, but the glycerin affords good protection to the mercury.

It is to be understood that by the term "canister" I wish to include any container or other device of any shape or form holding absorbent materials.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a method of simultaneously testing a plurality of gas treating canisters, passing gas through said canisters in multiple arrangement.

2. In a method of simultaneously testing a plurality of gas treating canisters, passing gas through said canisters in multiple arrangement and measuring with a single flow-meter gas passing through said canisters.

3. In a method of simultaneously testing a plurality of gas treating canisters and simulating human breathing through said canisters, drawing gas through said canisters intermittently.

4. In a method of simultaneously testing a plurality of gas treating canisters, simulating human breathing through said canisters by intermittently drawing gas through said canisters and ascertaining with a single measuring device the quantity of gas passing through said canisters.

5. In a method of testing gas treating canisters, diverting continuously into an analyzing vessel a small fraction of the total effluent gas from the canisters.

6. In a method of simultaneously testing without the aid of human breathing a plurality of gas treating canisters, diverting continuously into an analyzing vessel a small fraction of the total effluent gas from said canisters.

7. In a method of simultaneously testing without the aid of human breathing a plurality of gas treating canisters, flowing the main portion of the gas intermittently and a small fraction of the total gas continuously through said canisters.

8. In a method of testing gas treating canisters, intermittently drawing gas through said canisters and passing substantially all of the gas provided for the test through said canisters.

9. In a method of simultaneously testing without the aid of human breathing a plurality of gas treating canisters, drawing gas intermittently through a plurality of said canisters and through a flow-meter, the periods during which gas is drawn through the canisters of the last named plurality of canisters being non-coincident.

10. A method of testing gas treating canisters without the aid of human breathing comprising regulating the humidity of air, mixing the humidified air with another gas and passing the mixture through the canister and then through a flow-meter.

11. A method of testing gas treating canisters without the aid of human breathing comprising regulating the humidity of air, mixing the air with another gas, passing the mixture through the canister, then passing the main portion of effluent gas through a flow-meter and diverting a small portion of effluent gas to another flow-meter and then to an analyzing vessel.

12. In apparatus for testing gas treating canisters without the aid of human breathing means comprising a flow-meter for regulating the concentration of gas or vapor, in a mixture of gas or vapor with air, passing through said canisters.

13. In apparatus for testing gas treating canisters without the aid of human breathing means comprising a flow-meter for measuring and regulating the rate of flow of gas through said canisters.

14. In an apparatus for testing gas treating canisters without the aid of human breathing means comprising a valve and flow-meter for producing a regular intermittent flow of gas through said canisters.

15. In an apparatus for testing gas treating canisters without the aid of human breathing means comprising a valve having a liquid seal and a flow-meter for producing regular intermittent flow of gas through said canisters.

16. In an apparatus for testing gas treating canisters without the aid of human breathing means comprising a humidifier for regulating the quantity of moisture in gases entering said canisters.

17. In an apparatus for testing gas treating canisters without the aid of human breathing means for regulating the humidity of gases entering said canisters and means comprising a flow-meter for regulating the concentration of gas or vapor, in a mixture of gas or vapor with air, entering said canister.

18. In an apparatus for testing gas treating canisters without the aid of human breathing a humidifier, a liquid seal valve, a conduit for effluent gas from the canister, a flow-meter placed in said conduit.

19. In an apparatus for testing gas treating canisters without the aid of human breathing a humidifier, a liquid seal valve, a conduit for effluent gas from the canister, a flow-meter placed in said conduit and means for determining the pressure drop of gas in passing through said canister.

20. In an apparatus for testing gas treating canisters without the aid of human breathing a humidifier, a liquid seal valve, a conduit for effluent gas from the canister, a flow-meter placed in said conduit and a conduit having a cross-sectional area less than the first named conduit for delivery of test portion of effluent gas.

21. In an apparatus for testing gas treating canisters without the aid of human breathing a humidifier, a liquid seal valve, a conduit for effluent gas from the canister, a flow-meter placed in said conduit, a conduit having a cross-sectional area less than the first named conduit for delivery of test portion of effluent gas and means for determining the pressure drop of gas in passing through the said canister.

ARNO C. FIELDNER.

It is hereby certified that in Letters Patent No. 1,307,813, granted June 24, 1919, upon the application of Arno C. Fieldner, of Pittsburgh, Pennsylvania, for an improvement in "Methods and Apparatus for Testing Canisters," errors appear in the printed specification requiring correction as follows: Page 4, lines 123, 129, claims 6, 7, page 5, lines 10, 18, 24, 33-34, 39-40, 44-45, 49-50, 55-56, 60-61, 68-69, 73-74, 80-81, 88-89, claims 9-21, strike out the words "without the aid of human breathing;" page 5, line 1, claim 7, strike out the article "the"; same page, line 51, claim 15, strike out the article "a," second occurrence; same page, line 70, claim 18, strike out the comma and insert the word *and;* and that the said Letters Patent should be read with these corrections therein that the same may conform to the record of the case in the Patent Office.

Signed and sealed this 15th day of July, A. D., 1919.

[SEAL.]

Cl. 23—3.

R. F. WHITEHEAD,

*Acting Commissioner of Patents.*